United States Patent
Horst et al.

(10) Patent No.: US 8,618,224 B2
(45) Date of Patent: Dec. 31, 2013

(54) VISCOSITY BREAKING PROCESS FOR OLEFIN POLYMERS

(71) Applicant: BASF SE, Ludwigshafen (DE)

(72) Inventors: David E. Horst, Danbury, CT (US); Michael Roth, Lautertal, DE (US); Peter Nesvadba, Marly (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/893,530

(22) Filed: May 14, 2013

(65) Prior Publication Data

US 2013/0245203 A1     Sep. 19, 2013

Related U.S. Application Data

(63) Continuation of application No. 11/708,943, filed on Feb. 20, 2007, now abandoned.

(60) Provisional application No. 60/776,572, filed on Feb. 24, 2006.

(51) Int. Cl.
    *C08C 19/22*      (2006.01)
    *C08F 8/32*      (2006.01)
    *C08C 19/04*      (2006.01)
    *C08F 10/00*      (2006.01)
    *B29C 47/78*      (2006.01)
    *B29B 7/00*      (2006.01)

(52) U.S. Cl.
USPC ........ 525/375; 525/376; 525/387; 525/333.7; 264/211.24; 264/349

(58) Field of Classification Search
USPC .......... 525/375, 376, 387, 333.7; 264/211.24, 264/349
See application file for complete search history.

(56) References Cited

U.S. PATENT DOCUMENTS 3,361,713 A *    1/1968    Meyer et al. ................... 522/127

* cited by examiner

*Primary Examiner* — William Cheung
(74) *Attorney, Agent, or Firm* — Tyler A. Stevenson

(57) ABSTRACT

Disclosed is a method for viscosity breaking of a polypropylene polymer, a polypropylene copolymer or a polypropylene polymer blend, which process comprises adding a chain transfer agent and an initiator to a polypropylene polymer, polypropylene copolymer or polypropylene polymer blend and heating the resultant composition. The chain transfer agent has a Cs value of greater than or equal to about 0.04 as measured in ethylene polymerization at 130° C. The initiator is for example an organic or inorganic peroxide, a carbon based radical generator, a bis azo compound, a stable nitroxyl compound, a sterically hindered NO-acyl compound or a sterically hindered alkoxyamine compound.

14 Claims, No Drawings

VISCOSITY BREAKING PROCESS FOR OLEFIN POLYMERS

This application is a continuation of application Ser. No. 11/708,943, filed Feb. 20, 2007, now abandoned, which claims benefit of U.S. provisional application No. 60/776,572, filed Feb. 24, 2006, the contents of which are hereby incorporated by reference.

Disclosed are polypropylene, propylene copolymer or polypropylene blend compositions and a process for viscosity breaking (vis-breaking) of polypropylene, propylene copolymers or polypropylene blends.

The controlled preparation of polyolefin grades (polymer types having different molar masses, melt viscosities, densities, molar mass distributions, etc.) by customary compounding methods, for example by extrusion or injection molding, is a routine process employed by polymer manufacturers and polymer processors/compounders.

The setting of the desired parameters, for example the melt viscosity, by means of this polymer process step is critically dependent on the controlled reactivity and mode of action of the additives employed.

The use of free radical initiators for modifying the melt viscosity (rheology) of polyolefins is a generally known method. Whether it results in a lowering of the molecular weight (degradation) or an increase in the molecular weight (crosslinking) depends primarily on the chemical structure of the polyolefin.

The reaction of a polymer of the polypropylene type with a free radical initiator during a polymer processing step generally results in the degradation of the polymer, whereas polymers of the polyethylene type tend to crosslink.

In the case of copolymers and terpolymers or copolymer blends, high proportions of propylene produce polypropylene like behavior, while high proportions of ethylene result in polyethylene like behavior. If the above mentioned copolymers and terpolymers or copolymer blends comprise proportions of multiply unsaturated olefins, the probability of crosslinking decreases with decreasing concentration of free double bonds.

The controlled degradation of polypropylene (PP) to give a product having a lower molecular weight and a narrower molecular weight distribution is a commercially important process for producing 'controlled rheology' polypropylene (CR-PP). See for example Plastic Additives Handbook, $5^{th}$ ed., H. Zweifel, Ed., 2001, Hanser publishers, pp. 791-796. While specific PP grades ("reactor grades") are obtainable by optimization of the synthesis process or the catalyst systems (metallocene catalyst, Ziegler catalyst), standard PP grades are frequently modified in process technology by means of a processing step following the synthesis.

Known degradation processes proceed either thermally, in particular at temperatures above 280° C., or in the presence of free radical initiators. In process technology, the free radical induced process is carried out in extruders or injection molding machines at temperatures above for example 180° C. Suitable free radical initiators are organic peroxides which are added during the processing step in diluted form (PP Mastermix, diluted in oil, stabilized on inorganic supports) or directly as a liquid. Under the given processing conditions, the peroxide disintegrates into free radicals, which initiate the chain cleavage reactions and form polymers having the desired rheological properties (desired melt viscosities). The degradation of a PP to form a product having a lower molecular weight (higher melt flow rate (MFR)) is generally referred to as a viscosity-breaking or a vis-breaking process. The process is also referred to as a controlled rheology process.

CR-PP grades are mainly used for fiber applications and injection molding applications in which low melt viscosities are a prerequisite for economical processing. A wide range of melt viscosities or molecular weights is nowadays required in process technology.

A further parameter that influences the processing behavior of the polymer, in addition to the molecular weight, is the molecular weight distribution (MWD). While polymer grades having broad MWDs display improved orientation behavior of the polymer chains at low pull-off speeds in a fiber spinning process, the reverse is the case for high pull off speeds and broad MWDs. For this reason, narrow MWDs are essential at high pull-off speeds in order to achieve improved continuity in the spinning process.

The use of peroxides has a drawback, since only a restricted "processing temperature window" is available because of their decomposition temperatures, which are generally below the customary temperatures of polymer processing. In addition, strict safety regulations have to be adhered to during storage, handling and processing of peroxides. A further disadvantage of peroxides is the impossibility of decomposition-free melt compounding with polymers.

Apart from peroxides, other sources of free radicals are also known, e.g. C-radical generators based on cumyl systems, but these can be used only at temperatures above 280° C.

U.S. Pat. No. 6,133,414 describes a process for reducing the molecular weight of polymers at temperatures above 280° C. using so-called NOR-HALS (HALS: Hindered Amino Light Stabilizers), compounds containing the group:

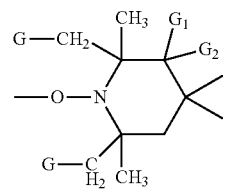

wherein G is hydrogen or methyl and $G_1$ and $G_2$ are each hydrogen, methyl or are together oxo. These known NOR-HALS compounds produce appreciable polymer degradation only at temperatures above 280° C.

Published U.S. app. No. 2003/216494 discloses a process for reducing the molecular weight of polypropylene, propylene copolymers or polypropylene blends, wherein a hydroxylamine ester of the formula:

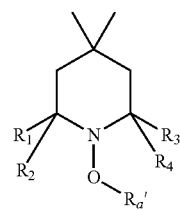

wherein among others $R_a'$ is a monoacyl radical and $R_1$-$R_4$ are alkyl-substituents; is added to the polypropylene polymers to be degraded, and the mixture is heated to temperatures below 280° C.

U.S. Pat. No. 6,599,985 teaches the preparation of high melt flow rate propylene polymers with the aid of cracking-resistant polymers.

One issue that is common to the process of visbreaking is the formation of volatile components. The condensable portion of volatiles produced during visbreaking or compounding is called "smoke". U.S. Pat. No. 5,834,541 discusses a way to reduce smoke formation by using a stabilization system containing among other ingredients, 2,2',2"-nitrilo[triethyl-tris(3,3'5,5'-tetra-tert-butylphenyl)phosphate.

The Polymer Handbook (4$^{th}$ Ed., John Wiley & Sons, Ed. Brandrup, Innergut, and Grulke) discusses the use of chain transfer agents for reducing the molecular weight in free radical polymerization. A chain transfer agent works during free radical polymerization by reacting with a growing polymer radical to form dead polymer and a new radical. The dimensionless transfer constant, $C_s$ is defined as the ratio of the rate constant for transfer of a radical to the chain transfer agent to the rate constant for propagation of the polymer chain by reaction with monomer. Experimental values for $C_s$ obtained during free radical polymerization of various monomers are compiled in the Polymer Handbook.

The present invention relates to the problem of improving the cited art with a more efficient method of vis-breaking polypropyelene. The present process further minimizes smoke (volatiles) generation during vis-breaking of polypropylene polymers. Likewise, the present invention will minimize smoke generation during any high temperature melt processing of PP. In addition, the required amount of initiator to achieve a desired amount of vis-breaking is reduced.

SUMMARY

Disclosed is a method for viscosity breaking of a polypropylene polymer, a propylene copolymer or a polypropylene polymer blend, which method comprises adding a chain transfer agent and an initiator to the polypropylene polymer, propylene copolymer or polypropylene polymer blend and heating the resultant composition, wherein the chain transfer agent has a Cs value of greater than or equal to about 0.04 as measured in ethylene polymerization at 130° C.

Also disclosed is a polymer composition comprising a polypropylene polymer, a polypropylene copolymer or a polypropylene blend, a chain transfer agent and an initiator, wherein the chain transfer agent has a Cs value of greater than or equal to about 0.04 as measured in ethylene polymerization at 130° C.

DETAILED DISCLOSURE

Polypropylene Polymer, Propylene Copolymer or Polypropylene Polymer Blend

The present polypropylene type polymers to be degraded may encompass propylene homopolymers, propylene copolymers and polypropylene blends. Propylene copolymers may contain various proportions, for example up to about 90%, or up to about 50%, of comonomers. Examples of comonomers such are: olefins such as 1-olefins, e.g. ethylene, 1-butene, 1-pentene, 1-hexene, 1-heptene or 1-octene, isobutylene; cycloolefins, e.g. cyclopentene, cyclohexene, norbornene or ethylidenenorborne; dienes such as butadiene, isoprene, 1,4-hexadiene, cyclopentadiene, dicyclopentadiene or norbornadiene; and also acrylic acid derivatives and unsaturated carboxylic anhydrides such as maleic anhydride.

Polypropylene blends which can be employed are for instance mixtures of polypropylene with polyolefins. Examples are blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

Chain Transfer Agent

The present chain transfer agent has a Cs value of greater than or equal to about 0.04 as measured in ethylene polymerization at 130° C.

The chain transfer agent may be of the class of thiols, disulfides, phosphorus acid esters, phosphines, organic iodides, organic chlorides, propionic (or higher) acid esters, aldehydes or tertiary amines.

The table below shows some values of $C_s$:

| Compound | *$C_s$ value for ethylene polymerization at 130° C. |
|---|---|
| decane | 0.012 |
| heptane | 0.008 |
| 2-methyl propane | 0.005, 0.0072 |
| 2,2,4 trimethyl pentane | 0.0064 |
| tributyl amine | 0.082 |
| trimethyl amine | 0.018, 0.033 |
| 1,1-bis(dimethylamino) ethane | 0.107 |
| propionaldehyde | 0.23, 0.33 |
| heptaldehyde | 0.26, 0.39 |
| 1-butanethiol | 5.8 |
| 2-methyl 2-propanethiol | 15 |

*values obtained from tables 4 or 5 of the Polymer Handbook, 4$^{th}$ Ed., John Wiley & Sons, Ed. Brandrup, Innergut, and Grulke For instance, the Cs value for the present chain transfer agents, as measured in ethylene polymerization at 130° C. is greater than or equal to about 0.05, greater than or equal to about 0.07, greater than or equal to about 0.08, greater than or equal to about 0.1, greater than or equal to about 0.15, greater than or equal to about 0.20, greater than or equal to about 0.50, greater than or equal to about 1.0, or greater than or equal to about 2.0, 3.0, 4.0 or 5.0.

For example, the present thiols and disulfides are of the formulae

or

where

R is an mono, di, tri or tetravalent hydrocarbyl group attached to the sulfur atom with a carbon atom and A is hydrogen or —SO$_3^-$B$^+$ where B$^+$ is an organic or inorganic cation.

Also included are thiouram sulfides, dithiocarbamates, mercaptobenzthiazoles and sulfenamides.

R, as hydrocarbyl which is attached to the sulfur atom with a carbon atom, is, for example, C$_8$-C$_{22}$alkyl, hydroxy-C$_2$-C$_8$alkyl, mercapto-C$_2$-C$_8$alkyl, mercapto-C$_8$-C$_{20}$alkyl interrupted by one or more —NH— groups, mercapto-C$_8$-C$_{20}$alkyl interrupted by one or more —OCO— groups, mercapto-C$_8$-C$_{18}$alkyl substituted by one or more hydroxyl groups, C$_8$-C$_{10}$aryl or is C$_6$-C$_{10}$aryl substituted by one or more substituents selected from the group consisting of C$_1$-C$_4$alkyl, 4-thiophenyl, 3-methyl-4-thiophenyl and C$_6$-C$_{10}$aryl-C$_1$-C$_4$alkyl.

R defined as $C_8$-$C_{22}$alkyl is straight-chain or branched $C_8$-$C_{18}$alkyl e.g. n-octyl, isooctyl types, e.g. 3,4-, 3,5- or 4,5-dimethyl-1-hexyl or 3- or 5-methyl-1-heptyl, other branched octyl types, such as 1,1,3,3-tetramethylbutyl or 2-ethylhexyl, n-nonyl, 1,1,3-trimethylhexyl, n-decyl, n-undecyl, 1-methylundecyl, 2-n-butyl-n-octyl, isotridecyl, 2-n-hexyl-n-decyl, 2-n-octyl-n-dodecyl or straight-chain $C_{12}$-$C_{19}$alkyl, e.g. lauryl (C12), myristyl (C14), cetyl (C16) or n-octadecyl (C18).

R defined as hydroxy-$C_2$-$C_8$alkyl is, for example, 2-hydroxyethyl, 2- or 3-hydroxypropyl, 4-hydroxy-2-hexyl or 4-hydroxy-3-hexyl.

R defined as mercapto-$C_2$-$C_8$alkyl is, for example, $C_2$-$C_8$alkyl substituted at the terminal carbon atom by a thiol (mercapto) group, e.g. 6-mercapto-n-hexyl or 5-mercapto-n-pentyl.

R defined as mercapto-$C_8$-$C_{20}$alkyl interrupted by one or more —NH— groups is exemplified by the substituted diamino-$C_2$-$C_4$alkylene groups:

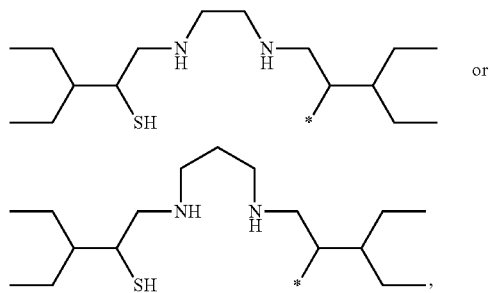

where * represents the bond to the S-A group.

R defined as mercapto-$C_8$-$C_{18}$alkyl substituted by one or more hydroxy groups is exemplified by the mercaptoethylene glycol group

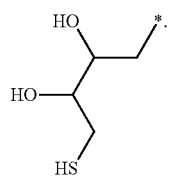

R as mercapto-$C_8$-$C_{20}$alkyl interrupted by one or more —OCO— groups is for example

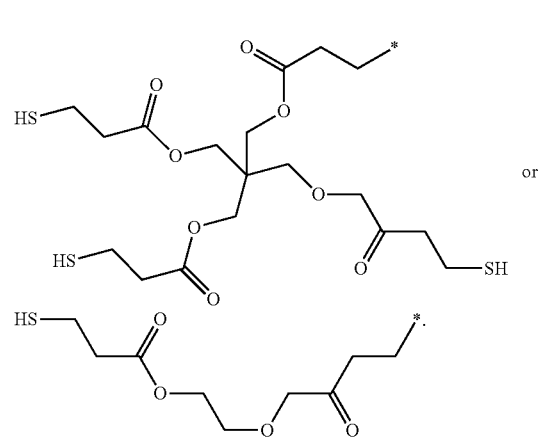

R defined as $C_6$-$C_{10}$aryl is for example phenyl.

R defined as $C_6$-$C_{10}$aryl substituted by one or more groups selected from the group consisting of $C_1$-$C_4$alkyl, 4-thiophenyl and 3-methyl-4-thiophenyl is exemplified by the following partial formula:

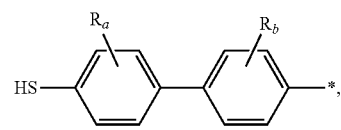

wherein $R_a$ and $R_b$ independently of one another represent hydrogen or methyl.

R defined as $C_6$-$C_{10}$aryl-$C_1$-$C_4$alkyl is, for example, benzyl, phen-1-ethyl or phenyl-2-ethyl.

A cation or a cationic group $B^+$ is for example, an alkali metal cation, e.g. sodium or potassium ion, ammonium ion, tri-$C_1$-$C_4$alkylammonium ion, e.g. the tetramethyl- or tetraethylammonium ion, or the cholinyl cation.

Suitable sulfur compounds, wherein R represents the above defined hydrocarbyl group, which is attached to the sulfur atom with a carbon atom and A represents hydrogen or the group

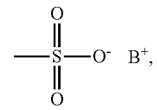

wherein $B^+$ represents the above defined cation or a cationic group, are for example represented by the following structural formulae:

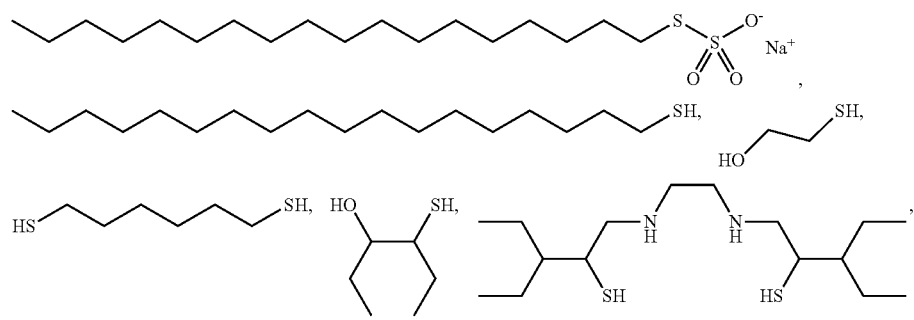

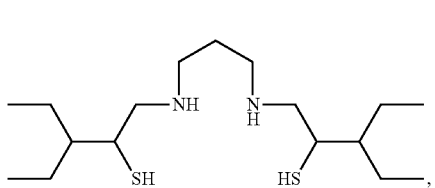 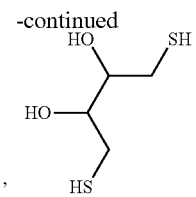 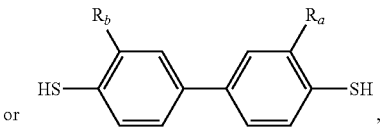

wherein $R_a$ and $R_b$ independently of one another represent hydrogen or methyl.

The sulfur compounds are known or can be obtained by known methods.

Initiator

The present initiators are for example organic or inorganic peroxides. Typical examples of suitable peroxides include 2,5-dimethyl-2,5-di(t-butylperoxy)hexane, 2,5-dimethyl-2,5-di(t-butyl peroxy)hexyne-3,3,6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

Other known initiators are carbon based radical generators, for example cumyl based systems.

Suitable bis azo compounds may also be employed as a source of free radicals. Such azo compounds are for example 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Free radical initiators may also be selected from known stable nitroxyl compounds. The nitroxyl initiators are for example of the generic structure

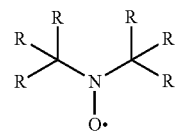

or are compounds that contain one or more groups of the formula

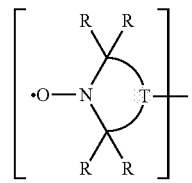

where each R is alkyl and T is a group required to complete a 5- or 6-membered ring.

Two or more nitroxyl groups may be present in the same molecule by being linked through the T moiety as exemplified below where E is a linking group.

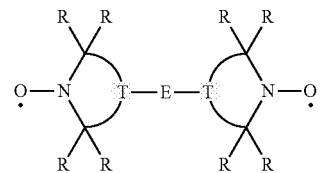

Typical nitroxyls include bis(1-oxyl-2,2,6,6-tetramethylpiperidin-4-yl)sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl 4-t-butyl-benzoate, bis(1-oxyl-2,2,6,6-tetramethylpiperidin-4-yl) succinate, bis(1-oxyl-2,2,6,6-tetramethylpiperidin-4-yl)adipate, bis(1-oxyl-2,2,6,6-tetramethylpiperidin-4-yl)n-butylmalonate, bis(1-oxyl-2,2,6,6-tetramethylpiperidin-4-yl)phthalate, bis(1-oxyl-2,2,6,6-tetramethylpiperidin-4-yl) isophthalate, bis(1-oxyl-2,2,6,6-tetramethylpiperidin-4-yl)terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl)]-s-triazine, 4,4'-ethylenebis(1-oxyl-2,2,6,6-tetramethylpiperazin-3-one), 2-oxyl-1,1,3,3-tetramethyl-2-isobenzazole, 1-oxyl-2,2,5,5-tetramethylpyrrolidine, and N,N-bis-(1,1,3,3-tetramethylbutyl)nitroxide.

Another suitable free radical initiator may be selected from the group consisting of the NO-acyl hindered amine (sterically hindered NO-acyl) compounds. These compounds are disclosed in published U.S. app. No. 2003/0216494, the contents of which are hereby incorporated by reference.

In particular, suitable NO-acyl compounds contain one or more moieties of the formula

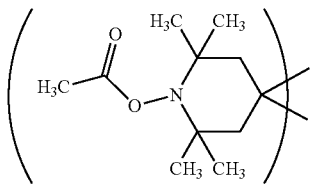

Further, initiators may also be selected from the group consisting hindered N-alkoxy hindered amine compounds, for example as disclosed in U.S. Pat. No. 6,133,414, the contents of which are hereby incorporated by reference.

For instance, the suitable hindered N-alkoxy (NOR hindered amine or sterically hindered alkoxyamine compound) contain one or more moieties of the formula

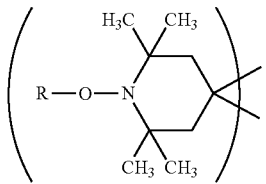

where R is for instance $C_1$-$C_{20}$alkyl, OH-substituted $C_1$-$C_{20}$alkyl or $C_5$-$C_{12}$cycloalkyl.

The above mentioned free radical initiators employed for controlled degradation are advantageously added to the polypropylene polymers in amounts smaller than those customary when they are used alone in the processes of the prior art.

In a further preferred embodiment of the present invention, at least 2 different free radical initiators having different decomposition temperatures are employed, so that the degradation of the polymers may occur in 2 stages. This process is also referred to as sequential degradation.

Suitable compositions comprise, for example, a combination of the above-mentioned peroxides and NOR-compounds or NO-acyl compounds.

It is essential that the two decomposition temperatures are sufficiently apart for effecting a 2-stage process. For example, a peroxide having a decomposition temperature in the range of about 180 to about 220° C. can be combined with an NO-acyl compound having decomposition temperatures in the range of about 240 to about 280° C. and/or with an NOR-compound having a decomposition temperature above 300° C.

It is of course possible to use mixtures of free radical generators having different decomposition temperatures in the process.

The addition to the polypropylene, propylene copolymers or polypropylene blend can be carried out in all customary mixing machines in which the polymer is melted and mixed with the additives. Suitable machines are known to those skilled in the art. They are predominantly mixers, kneaders and extruders.

According to a preferred embodiment of the invention the additives are added to blends of polypropylene with polyethylene selected from the group consisting of high density polyethylene (HDPE), high molecular weight high density polyethylene (HMW HDPE), ultra high molecular weight high density polyethylene (UHMW HDPE), medium density polyethylene (MDPE), low density polyethylene (LDPE), linear low density polyethylene (LLDPE), branched low density polyethylene (BLDPE) and ethylene-propylene-diene terpolymers (EPDM) containing small proportions of diene.

The process is preferably carried out in an extruder by introducing the additives during processing.

Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol. 1 Grundlagen*, Editors F. Hensen, W. Knappe, H. Potente, 1989, pp. 3-7, ISBN: 3-446-14339-4 (*Vol. 2 Extrusionsanlagen* 1986, ISBN 3-446-14329-7). For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually. The polymers may need to be subjected to an elevated temperature for a sufficient period of time, so that the desired degradation occurs. The temperature is generally above the softening point of the polymers.

In a preferred embodiment of the process of the present invention, a temperature range lower than 280° C., particularly from about 160° C. to about 280° C. is employed. In a particularly preferred process variant, the temperature range from about 200° C. to about 270° C. is employed. The period of time necessary for degradation can vary as a function of the temperature, the amount of material to be degraded and the type of, for example, extruder used. It is usually from about 10 seconds to 20 minutes, in particular from 20 seconds to 10 minutes.

In the process for reducing the molecular weight (degradation process) of the polypropylene polymers, the chain transfer agent is added for example at a level of from about 10 to about 2000 ppm by weight, based on the weight of the polymer. For example, the chain transfer agent is present from about 50 to about 1500 ppm, or from about 100 to about 1000 ppm, based on the weight of the polypropylene polymer.

The initiator is added in amounts within the same ranges as the chain transfer agents. The weight:weight ratio of the initiator to the chain transfer agent is between about 1:10 to about 10:1, for example between about 1:9 to about 9:1, between about 1:8 to about 8:1, between about 1:7 to about 7:1, between about 1:6 to about 6:1, between about 1:5 to about 5:1, between about 1:4 to about 4:1, between about 1:3 to about 3:1, between about 1:2 to about 2:1, or between about 1:1.5 to about 1.5:1.

While the sometimes volatile decomposition products (smoke) of peroxides (initiators) can lead to discoloration or odor in the degraded polymers, very little discoloration and odor occurs in the present process as the amount of peroxides is reduced and the temperature may be reduced.

Incorporation into the polymers can be carried out, for example, by mixing the above described additives and, if desired, further additives into the polymers using the methods customary in process technology.

Incorporation can, alternatively, also be carried out at temperatures, which do not yet cause decomposition of the polymers (latent compound). The polymers prepared in this way can subsequently be heated a second time and subjected to an elevated temperature for a sufficient period of time so that the desired polymer degradation occurs.

The present additives can also be added to the polymers to be degraded in the form of a masterbatch, in which these compounds are present, for example, in a concentration of from about 1.0 to about 25.0% by weight. The masterbatch (concentrate) can be produced at temperatures, which do not yet cause decomposition of the compounds of the present invention.

This provides a product, which is defined by specific dosage amounts and may be compounded with other additives. The masterbatch can then be compounded with the polymer to be degraded.

The present invention therefore further provides a concentrate in which the chain transfer compounds are present in a concentration of about 1.0 about 25.0% by weight and which can be added to the polymer to be degraded. The desired product is thus obtainable in an advantageous two-stage process.

In a specific embodiment, suitable further additives, such as metal salts, e.g. of Ca, Fe, Zn or Cu, are added to the polymers to be degraded. Particular preference is given to the presence of a metal salt selected from the group consisting of CaO, $CaCO_3$, ZnO, $ZnCO_3$, MgO, $MgCO_3$ and $Mg(OH)_2$.

Apart from the additives discussed herein, further additives may also be present in the polymer. For example, additives selected from the group consisting of the dialkylhydroxylamine, sterically hindered amine, phenolic antioxidant, benzofuranone, organic phosphorus compounds and hydroxyphenylbenzotriazole, hydroxyphenyl-s-triazine or benzophenone ultraviolet light absorbers.

For instance, further additives are stabilizers selected from the group consisting of pentaerythrityl tetrakis(3-(3,5-di-tert-butyl-4-hydroxyphenyl)propionate), octadecyl 3-(3,5-di-tert-butyl-4-hydroxyphenyl)propionate), 3,3',3',5,5',5'-hexa-tert-butyl-α,α',α'-(mesitylene-2,4,6-triyl)tri-p-cresol, calcium diethyl bis(((3,5-bis(1,1-dimethylethyl)-4-hydroxyphenyl)methyl)phosphonate), 1,3,5-tris(3,5-di-tert-butyl-4-hydroxybenzyl)-1,3,5-triazine-2,4,6(1H,3H,5H)trione, tris(2,4-di-tert-butylphenyl)phosphite, tris(nonylphenyl)phosphite, tetrakis(2,4-di-tert-butylphenyl) [1,1-biphenyl]-4,4'-diylbisphosphonite, didodecyl 3,3'-thiodipropionate, dioctadecyl 3,3'-thiodipropionate, 5,7-di-tert-butyl-3-(3,4-dimethylphenyl)-3H-benzofuran-2-one and di-hydrogenated-tallowalkylhydroxylamine.

Further additives are antacids, such as calcium stearate or zinc stearate, hydrotalcites or calcium lactate or calcium lactylate.

The invention is illustrated by the following Examples. Levels are in weight percent based on polyolefin unless otherwise indicated.

EXAMPLE 1

Polypropylene homopolymer manufactured by the Spheripol process, nominal melt index 4.6 dg/min (2.36 kg/230° C.), commercially available as Profax® 6501 from Basell Polyolefins, is visbroken to a target melt index of 38 by compounding the polymer with 2,5-dimethyl-2,5-di-tertbutylperoxy-hexane (DTBPH). The amount of DTBPH is adjusted as necessary in order to obtain the target melt flow. Base stabilization is 1000 ppm of tris(2,4-di-tert-butylphenyl)phosphite, 500 ppm of a di-hydrogenated-tallowalkylhydroxylamine processing stabilizer and 500 ppm of calcium lactate. The formulation of the present invention is additionally compounded with 200 ppm of pentaerythritol tetrakis(3-mercaptopropionate) (PTOP; CASRN 7575-23-7; available from Aldrich chemical company) or with 356 ppm tri-dodecylamine as chain transfer agents. The formulations are visbroken on an MPM single screw extruder. The extruder is fitted with a polyolefin screw with a Maddock mixing head operated at 90 RPM. The four zone temperatures are set at 475, 500,525, and 525° F. The extruder has a length to diameter ratio of 24:1. The results are the average of 2 experiments. Results are below.

| Formulation | Chain Transfer Agent | Amount of DTBPH Required |
|---|---|---|
| control | none | 642 ppm |
| 1 | 200 ppm PTOP | 241 ppm |
| 2 | 356 ppm tri-dodecylamine | 540 ppm |

It is seen that the additional compounding with the present chain transfer agents results in a significant reduction of the amount of initiator required.

EXAMPLE 2

Example 1 is repeated, with base stabilization of 1000 ppm tris(2,4-di-tert-butylphenyl)phosphite, 500 ppm di-hydrogenated-tallowalkylhydroxylamine and 250 ppm calcium lactate. In this experiment, the amount of the peroxide DTBPH is varied. Melt flow with and without 200 ppm PTOP is shown in the following table.

| | Melt Flow | |
|---|---|---|
| peroxide ppm | control | control + 200 ppm PTOP |
| 0 | 3.7 | 3.9 |
| 100 | 6.1 | 7.8 |
| 200 | 9.5 | 22.7 |
| 300 | 12.8 | 41.0 |
| 450 | 18.2 | 74.2 |
| 600 | 28.3 | 136.8 |

It is seen that far greater melt flow rates are achieved with formulations of the present invention that include both a peroxide and a certain chain transfer agent.

EXAMPLE 3

Example 1 is repeated, with base stabilization of 1000 ppm phosphate process stabilizer, 500 ppm di-hydrogenated-tallowalkylhydroxylamine and 250 ppm calcium lactate. Again, PP homopolymer is visbroken to a target melt flow of 38 dg/min with the initiator as in Example 1. With no chain transfer agent, 642 ppm of DTBPH are required, with 200 ppm PTOP, 241 ppm of DTBPH are required. The following procedure is used to estimate the relative proportions of low molecular weight fragments that are produced during the visbreaking process. The polymer pellets from the extruder are contacted with methylene chloride at room temperature for a duration of 2 days shaking occasionally each of the samples. The ratio of polymer to methylene chloride is 40 g to 100 g.

The extracts are shot on a GC with a constant injection volume of 1 micro liter. The peaks between 3 minutes and 20.5 minutes are integrated and summed and considered as volatiles (extractables). The GC is performed under the following conditions: 30m ZB-5 capillary column (equivalent to DB-5), temperature program is 40° C. held for 1 minute then programmed at 15° C. per minute to 300° C. and held. The integrated counts for the various formulations are shown below.

| chain transfer agent | counts |
|---|---|
| none | 9635 |
| none | 10497 |
| none | 9879 |
| none* | 10305 |
| 200 ppm PTOP | 5203 |

*contains 1000 ppm of pentaerythrityl tetrakis(3-(3,5-di-tert-butyl-4-hydroxyphenyl)propionate in place of the hydroxylamine stabilizer.

The presence of the chain transfer agent PTOP during the visbreaking results in a significant reduction in the amount of low molecular weight extractable material produced during the visbreaking process.

EXAMPLE 4

Polypropylene homopolymer (Moplen® FLF20 from Basell) is visbroken with 500 ppm of DTBPH and varying amounts of octadecane thiol (C18-SH). All of the formulations contained base stabilization of 500 ppm of pentaerythrityl tetrakis(3-(3,5-di-tert-butyl-4-hydroxyphenyl)propionate, 500 ppm of tris(2,4-di-tert-butylphenyl)phosphite, and 500 ppm of calcium stearate. The extrusion temperature is 250° C. The melt flow rate is determined at 230° C. using a 2.16 kg weight with a die diameter of 0.75 mm. The results are shown below.

| amount of C18-SH | MFR |
|---|---|
| none | 4.0 |
| 62 ppm | 7.7 |
| 125 ppm | 11.9 |
| 250 ppm | 14.2 |

What is claimed is:

1. A method for viscosity breaking of a polypropylene polymer, a propylene copolymer or a polypropylene polymer blend,
which method comprises
adding a chain transfer agent and an initiator to the polypropylene polymer, propylene copolymer or polypropylene polymer blend and heating the resultant composition,
wherein the chain transfer agent has a Cs value of greater than or equal to about 0.04 as measured in ethylene polymerization at 130° C. and
where the chain transfer agent is of formula R—SH where R is mercapto-$C_8$-$C_{20}$alkyl interrupted by one or more —OCO— groups.

2. A method according to claim 1 where the chain transfer agent is pentaerythritol tetrakis(3-mercaptopropionate).

3. A method according to claim 1 where the initiator is an organic or inorganic peroxide, a carbon based radical generator, a bis azo compound, a stable nitroxyl compound, a sterically hindered NO-acyl compound or is a sterically hindered alkoxyamine compound.

4. A method according to claim 1 where the initiator is an organic or an inorganic peroxide which is 2,5-dimethyl-2,5-di(t-butylperoxy)hexane, 2,5-dimethyl-2,5-di(t-butylperoxy)hexyne-3, 3,6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-di-perisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

5. A method according to claim 1 where the initiator is 2,5-dimethyl-2,5-di-tertbutylperoxyhexane.

6. A method according to claim 1 where the initiator is an azo compound which is 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

7. A method according to claim 1 where the initiator is a stable nitroxyl compound which is of the formula

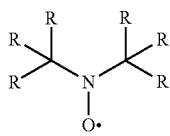

or which contains one or more groups of the formula

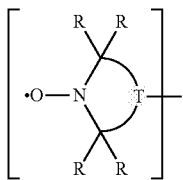

where each R is methyl or ethyl and T is a group required to complete a 5- or 6-membered ring.

8. A method according to claim 1 where the initiator is a stable nitroxyl compound which is bis(1-oxyl-2,2,6,6-tetramethylpiperidin-4-yl)sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl 4-t-butyl-benzoate, bis(1-oxyl-2,2,6,6-tetramethylpiperidin-4-yl)succinate, bis(1-oxyl-2,2,6,6-tetramethylpiperidin-4-yl)adipate, bis(1-oxyl-2,2,6,6-tetramethylpiperidin-4-yl)n-butylmalonate, bis(1-oxyl-2,2,6,6-tetramethylpiperidin-4-yl)phthalate, bis(1-oxyl-2,2,6,6-tetramethylpiperidin-4-yl)isophthalate, bis(1-oxyl-2,2,6,6-tetramethylpiperidin-4-yl)terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl)]-s-triazine, 4,4'-ethylenebis(1-oxyl-2,2,6,6-tetramethylpiperazin-3-one), 2-oxyl-1,1,3,3-tetramethyl-2-isobenzazole, 1-oxyl-2,2,5,5-tetramethylpyrrolidine or N,N-bis-(1,1,3,3-tetramethylbutyl) nitroxide.

9. A method according to claim 1 where the initiator is a sterically hindered NO-acyl compound that contains one or more of the moieties of the formula

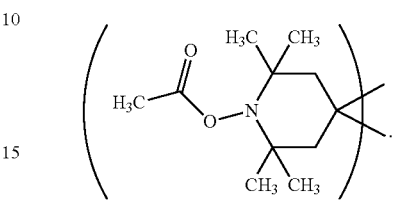

10. A method according to claim 1 where the initiator is a sterically hindered alkoxyamine compound contains one or more moieties of the formula

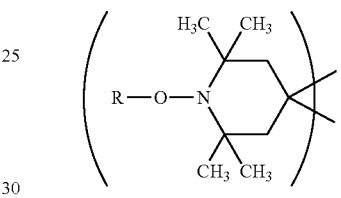

where R is $C_1$-$C_{20}$alkyl, OH-substituted $C_1$-$C_{20}$alkyl or $C_5$-$C_{12}$cycloalkyl.

11. A method according to claim 1 where the chain transfer agent and the initiator are present from about 10 ppm to about 2000 ppm by weight, based on the weight of the polypropylene polymer, propylene copolymer or polypropylene polymer blend.

12. A method according to claim 1 where the weight:weight ratio of initiator to chain transfer agent is between about 1:10 to about 10:1.

13. A method according to claim 1 where the heating takes place in an extruder.

14. A method according to claim 1 where the heating takes place between about 160° C. and about 280° C.

* * * * *